W. G. GRIMSLEY.
CATTLE RELEASING DEVICE.
APPLICATION FILED DEC. 21, 1908.

964,772.

Patented July 19, 1910.

Witnesses

Inventor
Wril G. Grimsley
by Alfred M. Allen
Attorney

UNITED STATES PATENT OFFICE.

WIVEL G. GRIMSLEY, OF CINCINNATI, OHIO.

CATTLE-RELEASING DEVICE.

964,772. Specification of Letters Patent. Patented July 19, 1910.

Application filed December 21, 1908. Serial No. 468,644.

*To all whom it may concern:*

Be it known that I, WIVEL G. GRIMSLEY, a citizen of the United States, residing in Cincinnati, county of Hamilton, and State of Ohio, have invented certain new and useful Improvements in Cattle-Releasing Devices, of which the following is a full, clear, and exact description, reference being had to the accompanying drawings, forming part of this specification.

The object of my invention is to provide a fastening device for securing cattle in stalls and the like, which can be readily and easily released should occasion demand, without unfastening in the usual way the chain, cord or strap, with which the cattle are tied.

My invention is especially applicable where cattle are secured in stalls and pens for fattening purposes, close together, and with only a short length of chain or strap for securing them.

It frequently happens in such cases that some of the cattle may fall down, or lie down in such a way, as to take up entirely the slack of chain, and they will thus lie with the chain around the neck with their entire weight on the chain, unable to rise, and unless released, are in great danger of choking to death. Also in case of fire or other exciting cause, the cattle may pull back on the chain or strap, so as to suspend their entire weight therefrom. Under such circumstances, it is impossible to obtain sufficient slack of the chain to release the device in the ordinary way. And while releasing devices have been provided for the speedy release of cattle in case of fire, in such devices so far as known, the strain in the event that the cattle are resting with their full weight on the retaining pin is such, that the parts are apt to jam and render futile, the operation of the construction for the purpose intended.

It is to provide a ready and convenient construction easily adapted to the existing conditions, for releasing the cattle under such circumstances, that my invention is directed, and it consists of that novel construction and arrangement of parts to be hereinafter particularly pointed out and claimed.

Figure 1:
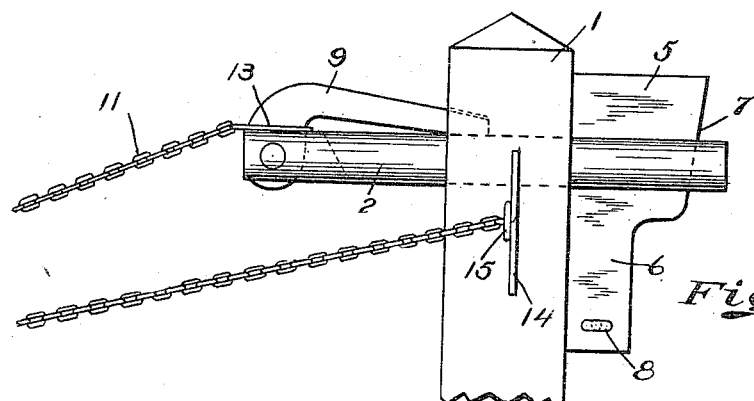
Figure 2:
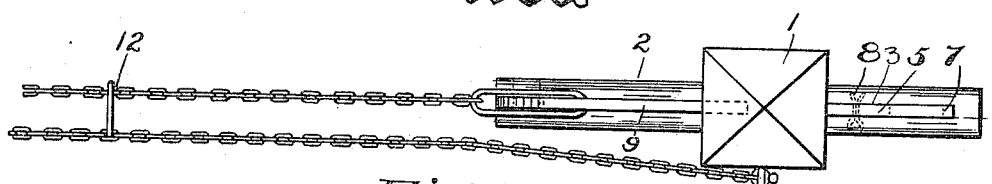
Figure 3:
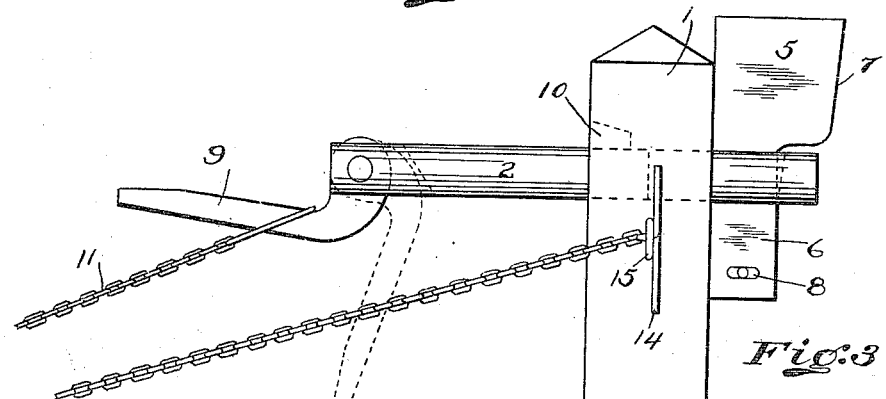
Figure 4:
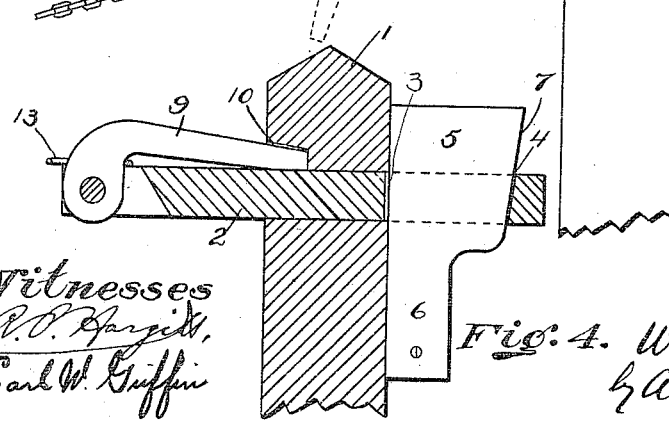

In the drawings Figure 1 is a side elevation of my improvements with the retaining tongue locked in place. Fig. 2 is a top plan view of same. Fig. 3 is a side elevation with the retaining tongue released. Fig. 4 is a central vertical section of the device as illustrated in Fig. 1.

1 is the post or bar in the stall, or pen, to which the animal is to be secured.

2 is a metal pin which is passed through a horizontal central opening in the post 1. This pin is provided with a slot 3, cut through the pin, and beveled at its forward edge 4, and 5 is a key plate which is passed down through the slot 3, to hold the pin in place. The front edge of this key plate is cut away below so as to form a narrow portion 6, and the upper portion is beveled at 7, to fit within the beveled slot, while the rear edge of the key plate bears against the rear face of the post.

8 is a cotter pin to prevent the key from dropping out when the key is driven up to release the pin, as hereinafter described. The forward end of the pin is provided with a tongue 9, pivoted thereon, and for locking the tongue, a socket 10 is formed in the post above the hole, through which the pin 2 passes.

11 is the chain with which the animal is secured, usually by simply passing the same around the neck, and forming a loop with the link 12. One end of this chain is provided with a loop 13, which is slipped over the tongue 9, for securing same, and the other end of the chain is provided with a cross bar 14, which is passed through an eye 15, secured to the post.

It will be evident from this construction, that when the chain is thus secured by one end to the post, and looped over the neck of the animal, and the loop 13 passed over the tongue 9, and the pin and tongue pushed in as shown in Fig. 1, and the key plate 5 driven to place, that the animal will be securely fastened.

Of course, one end of the chain may be riveted to the post, but by providing the cross bar 14 and eye 15, ordinarily the chain may be released by taking up the slack and passing the cross bar 14, through the eye 15. In the event, however, that the animal should slip and fall, or for any other reason rest with its entire weight on the chain, it will be impossible to take up the slack to release the cross bar 14. Under these circumstances, the key plate 5 is driven up as shown in Fig. 3, and the pin can be partially withdrawn. The tension on the chain will instantly do this, and the tongue 9 will open, and the animal be at once released.

Inasmuch as the pull on the device is practically in line with, or at a slight angle to the longitudinal axes of the pin, there is no likelihood of the parts jamming in any way.

Having thus described my invention what I claim as new and desire to secure by Letters Patent, is:

In a device of the character specified, the combination with a fixed vertical post having a substantially horizontal opening therethrough, of a pin passing loosely through said opening, a tongue pivoted to the pin at one end and said pin provided with a slot at the other end, with said post having a socket to receive the inner end of said tongue, and a key plate engaging said slot and abutting against the post to lock the pin to the post with the socket engaged by the tongue, said key plate having a cut away portion to allow the pin to be partially withdrawn to release the tongue from the socket without releasing the pin from the post.

WIVEL G. $\overset{\text{his}}{\times}$ GRIMSLEY.
mark

Witnesses:
PHIL. C. KAMMERER,
ARTHUR H. EWALD.